US011004023B2

(12) United States Patent
Bacallao et al.

(10) Patent No.: US 11,004,023 B2
(45) Date of Patent: May 11, 2021

(54) VIDEO CARD TRAINING SYSTEM

(71) Applicant: Walmart Apollo, LLC, Bentonville, AR (US)

(72) Inventors: Yurgis Mauro Bacallao, Centerton, AR (US); Jaclyn Moreda, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 30 days.

(21) Appl. No.: 16/618,900

(22) PCT Filed: May 23, 2018

(86) PCT No.: PCT/US2018/034128
§ 371 (c)(1),
(2) Date: Dec. 3, 2019

(87) PCT Pub. No.: WO2018/226410
PCT Pub. Date: Dec. 13, 2018

(65) Prior Publication Data
US 2020/0097886 A1 Mar. 26, 2020

Related U.S. Application Data

(60) Provisional application No. 62/515,925, filed on Jun. 6, 2017.

(51) Int. Cl.
*G06Q 10/06* (2012.01)
*H04W 4/029* (2018.01)
(Continued)

(52) U.S. Cl.
CPC ... *G06Q 10/063114* (2013.01); *G06F 1/1652* (2013.01); *G06K 9/00006* (2013.01); *G09B 5/065* (2013.01); *H04W 4/029* (2018.02)

(58) Field of Classification Search
CPC .. G06K 9/00006; G06K 9/00771; G06T 7/70; G06T 2207/30232; G06Q 10/06;
(Continued)

(56) References Cited

U.S. PATENT DOCUMENTS

| 2005/0065452 | A1 | 3/2005 | Thompson | 600/558 |
| 2008/0224853 | A1* | 9/2008 | Patel | G06Q 10/06 340/539.13 |

(Continued)

OTHER PUBLICATIONS

International Search Report & Written Opinion in PCT/US2018/034128 dated Aug. 10, 2018; 9 pages.
(Continued)

*Primary Examiner* — Andrew W Johns

(57) ABSTRACT

A video training system is described for making short training videos available to employees at their work locations which are simple to operate. It employs several inexpensive video cards each which are loaded with several training videos that redistributed to users at their work locations. A training status device keeps track of which training videos are on which video cards. A tracking base tracks the locations of each video card. Each card has biometrics for identifying the user using each video card. Training status device receives the identity of the current user, checks to see which training videos that current user must view, but did not already view and provides this information to a logic device. Logic device receives the current location of the video cards having the training videos and notifies the current user where to find the video cards.

20 Claims, 5 Drawing Sheets

(51) Int. Cl.
  *G06F 1/16*     (2006.01)
  *G09B 5/06*     (2006.01)
  *G06K 9/00*     (2006.01)

(58) Field of Classification Search
  CPC ...... G06Q 10/06311; G06Q 10/063114; G09B 5/065; G09B 7/00; H04L 67/18; H04W 4/029
  See application file for complete search history.

(56) References Cited

U.S. PATENT DOCUMENTS

| | | | |
|---|---|---|---|
| 2010/0028845 A1 | 2/2010 | Myer et al. | 434/323 |
| 2011/0215155 A1 | 9/2011 | Bonneau, Jr. et al. | 235/487 |
| 2016/0063313 A1 | 3/2016 | Sandholm et al. | G06K 9/00288 |

OTHER PUBLICATIONS

International Preliminary Report on Patentability in PCT/US2018/034128 dated Feb. 26, 2019; 4 pages.

\* cited by examiner

VIDEO CARD TRAINING SYSTEM

RELATED APPLICATIONS

This application claims the benefit of U.S. Provisional Patent Application No. 62/515,925, filed Jun. 6, 2017 and entitled "Video Card Training System," the contents of which are incorporated herein in their entirety.

FIELD

The current invention is a simplified device and system for providing training to employees, and more specifically to a simplified device and system for providing training to employees at their normal workstation.

BACKGROUND

Companies are constantly coming out with new procedures, improvements on current processes (collectively "New Procedures"). This can be in any industry; however, for the purposes of this document, we shall focus on retail sales.

These New Procedures must be relayed to the employees. Currently, this is done with training seminars.

The training seminars require typically require a presentation, computer, projector, screen, etc. Due to the equipment involved, these are typically presented in a conference room specifically designed to have this equipment.

Since these New Procedures are created randomly over time, and many are small incremental advancements that do not justify a seminar by themselves, management typically accumulates these over time and then requires the employees to attend a training seminar on the accumulated New Procedures.

Some of these New Procedures are only relevant to a portion of the employees, while other New Procedures are relevant to different portion of the employees. Therefore, employees are required to sit through seminars which describe New Procedures which have little or no relevance to them. For example, there may be New Procedures which affects cashiers, but not those stocking shelves. This wastes the employees time that can be applied to more productive tasks.

Another approach would be to divide the employees into groups by function, accumulate New Procedures for each individual group and have separate training seminars for each group. If one were to wait until there were enough New Procedures to fill a longer seminar, then it would take time and the information would be 'stale' by the time it is presented. If one were to have many short seminars, then the information would be 'fresh', but the employees would waste a good amount of time going to, and returning from seminars.

Another approach would be to load training videos on general purpose computing tablets and distribute them to the employees. The cost, complexity and potential for theft of the computing pads would not make this approach feasible.

Currently, there is a need to efficiently provide training to employees without requiring significant equipment or conference rooms, that is easy to track.

BRIEF SUMMARY

According to aspects of the present inventive concepts there is provided an apparatus and method as set forth in the appended claims. Other features of the inventive concepts will be apparent from the dependent claims, and the description which follows.

The current invention may be embodied as a video training system 1000 adapted to efficiently train users 3 at their work locations in a retail store, having a plurality of video cards 100 distributed to the users, each adapted to play back training videos. Each video card 100 has a substantially thin body 5, preferably constructed of an inexpensive material, a power source 123, a biometric device 25 for identifying a user 3, a memory device 110 having prestored training videos 111, a communications device 119 adapted to wirelessly communicate with an external device, a tracking device 117 allowing its location to be tracked by a tracking base 1010, a flexible, low-power video screen 51, a controller 121 coupled to the storage or memory device 110, adapted to play the prestored training videos on the flexible, low-power video screen 51. The system also includes, a tracking base 1010 adapted to track locations of the tracked devices 117 of the plurality of video cards 100, a training status device 1020 having prestored information of which training videos each user 3 is to view. The training status device is adapted to communicate with the communications device 119 of the video cards 100, receive information on the users 3 that have used each video card 100, and the training videos viewed by each user 3, determine which training videos each user 3 needs to view, but has not yet viewed. The system also includes a logic device 1030 coupled to the tracking base 1010 and the training status device 1020 adapted to determine for each user 3 the training videos that need to be viewed, the video cards 100 have these training videos, locations of these video cards 100, and notify the user of the videos that need to be viewed, the cards having these training videos and their locations.

The current invention may also be embodied as a method of providing training to a plurality of users 3 at their worksite comprising the steps of providing a plurality of low-power video cards 100 adapted to store and play back training videos on a flexible, low-power video screen 51, identifying which training videos should be viewed by each user 3, loading the identified training videos on the video cards 100 such that every identified video is on at least one video card 100, identifying the training videos loaded on each video card 100, providing the loaded video cards 100 to the users 3, tracking locations of each of the video cards 100, employing biometrics to identify the user 3 using a video card 100, and monitoring the training videos viewed by the identified user 3, providing an indication of the training videos that the user 3 needs to view but has not yet viewed, and the locations of the video cards 100 having these training videos.

The current invention may also be embodied as video training system adapted to efficiently train users in various departments of a retail store having a plurality of disposable video cards 100 distributed in the departments, each video card 100 having a flat body 5 made of a disposable material, a storage or memory device 110 adapted to store training videos, a communication device 119 adapted to wirelessly receive training video data and store it in the storage device 110, a tracked device 117 allowing its location to be tracked by an external device, a flexible, low-power video screen 51 that is attached to the flat body 5, a controller 121 adapted to display the received video data on the flexible, low-power video screen 51, and a writable portion 13 on the flat body 5 allowing users 3 to mark on the writable portion 13 that they have viewed a training video on this video card 100.

The system also includes a tracking base 1010 adapted to track locations of the tracked devices 117 of the plurality of video cards 100, a training status device 1020 having prestored information of which training videos each user 3 is to view. The tracking base 1010 is adapted to communicate with the communication device 119 of the video cards 100, receive information from the communication devices 119 of the users that have used each video card 100, and the training videos viewed by each user 3, determine which training videos each user 3 needs to view, but has not yet viewed. The system further includes a logic device 1030 coupled to the tracking base 1010 and the training status device 1020 adapted to determine for each user the training videos that need to be viewed, the video cards 100 having these training videos, the locations of these video cards 100, and notify the user 3 of the videos that need to be viewed, the video cards 100 having these training videos and their locations. The video cards also include input devices 61, 62, 63 (collectively "60") which receive user input and provide the user input to the controller 121.

BRIEF DESCRIPTION OF SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale; emphasis instead being placed upon illustrating the principles of the concepts. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DETAILED DESCRIPTION

Theory

The current invention may be implemented and described in several different ways. It will be implemented and described in terms of a system having a plurality of inexpensive video training cards which provide short training videos to specified groups of employees. Since each group only requires smaller number of training videos, the dedicated video cards intended to be used by the group only must store or have access to these training videos. Since the video cards are preferably constructed of cardboard or other inexpensive material, is required to access only a small number of short videos, and has limited functionality, it can be designed to be inexpensive, and therefore, many may be distributed to many groups.

Implementation

Figure 1:
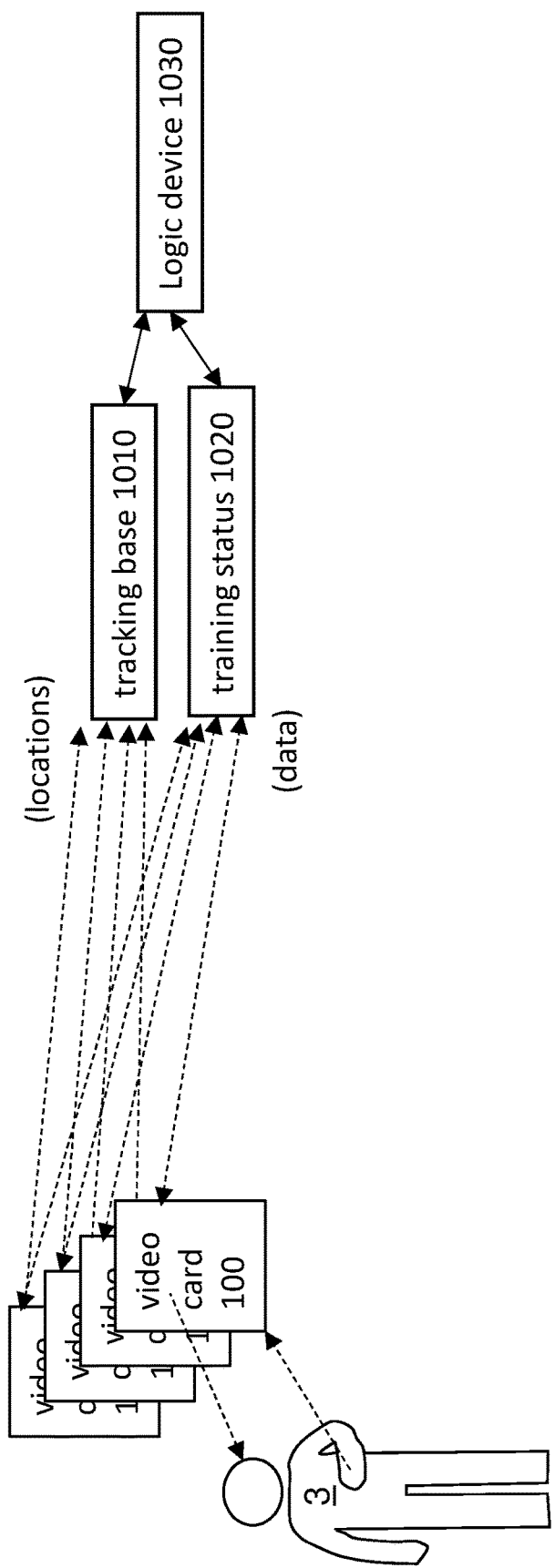
FIG. 1 shows a video training system according to one embodiment of the present invention.

FIG. 1 shows a video training system according to one embodiment of the present invention. It employs a plurality of video cards 100 each which store one or more short training videos. Each video card 100 has a flexible screen and electronics to play back the training videos to a user.

A tracking base 1010 tracks the locations of the video cards 100 and keeps a running track of where all the video cards 100 are located at any instant in time.

A training status device 1020 has pre-stored indications of which training videos each of the users are intended to view. It also interacts with each other video card 100 to accumulate information indicating which users have already viewed which training videos.

Logic device 1030 interacts with training status device 1020 to determine for a current user which training videos the current user has already viewed, which training videos the user has yet to view, and which video cards 100 have these training videos.

Logic device 1030 also interacts with tracking base 1010 to determine the current location of each card storing a training video that the current user has not yet viewed.

Logic device 1030 then passes this information through training status device 1020 to the specific video card 100 which the current user is using.

The current user may then go to the location indicated to get the video card 100 indicated having at least one training video which the current user should view.

Figure 2:
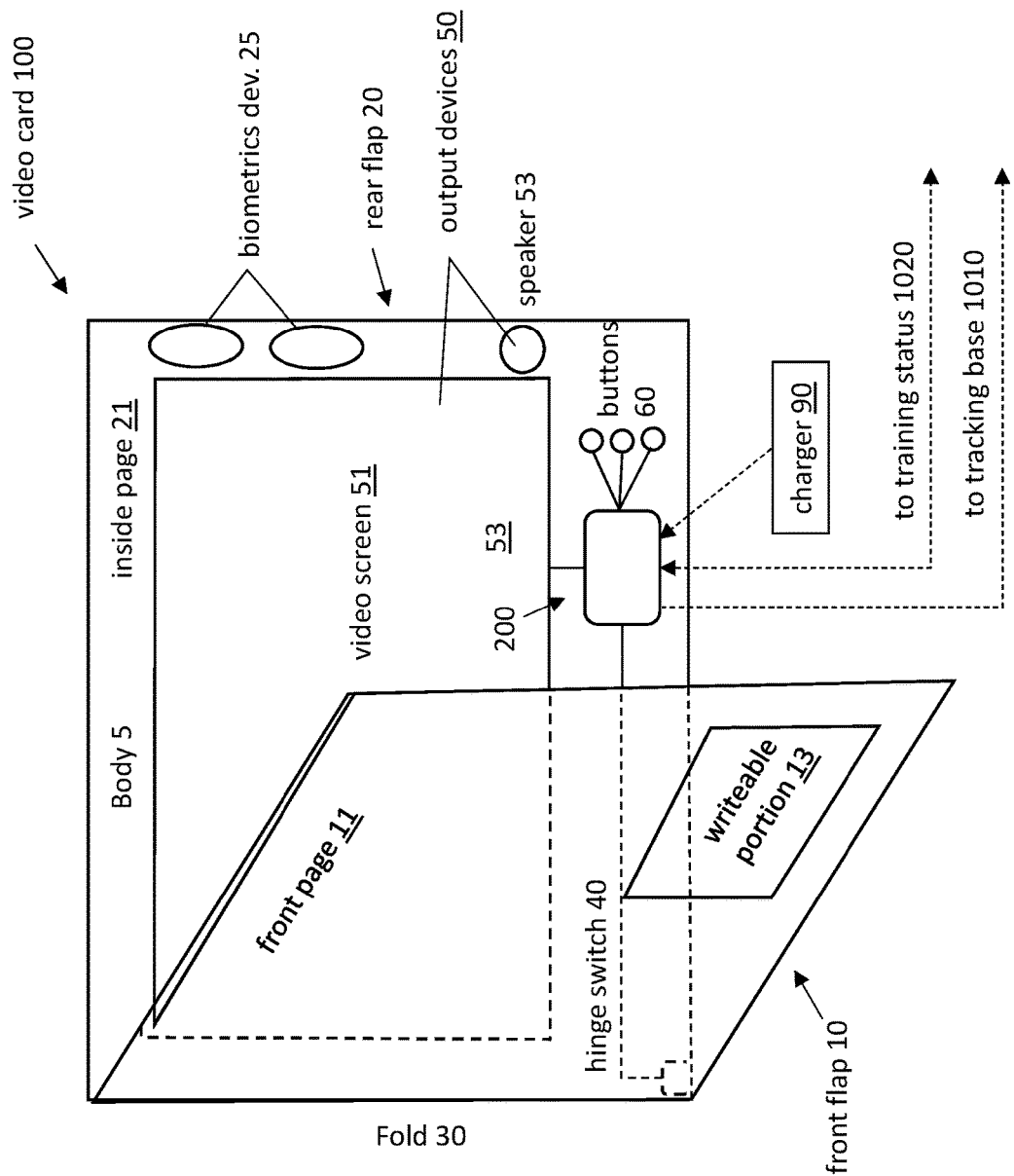
FIG. 2 is a simplified block diagram of one of the video cards of the system of FIG. 1.

FIG. 2 is a simplified block diagram of one of the video cards 100 of the system 1000 of FIG. 1. In this embodiment, a folding video card 100 has a front flap 10 and a rear flap 20 which are joined at a fold 30 in video card 100. Alternatively, the front flap 10 and rear flap 20 may be separate pieces that are joined together by a fold 30 which allows front flap 10 to pivot with respect to rear flap 20.

Front flap 10 has a front page 11 and an inside page, that is not visible from the viewpoint of FIG. 2.

Rear flap 20 has an inside page 21 that is visible in FIG. 1A, and a rear page which is not visible from the viewpoint of FIG. 2.

Video card 100 may be made of a thin cardboard, several sheets of paper bonded together, plastic material, composite material or similar material that would supply support for the dedicated video training system 1000.

Dedicated video training system 1000 employs a hinge switch 40 which connects to an electronics unit 120. Hinge switch 40 senses when front flap 10 is closed against rear flap 20, and when front flap 10 is opened away from rear flap 20.

Figure 3:
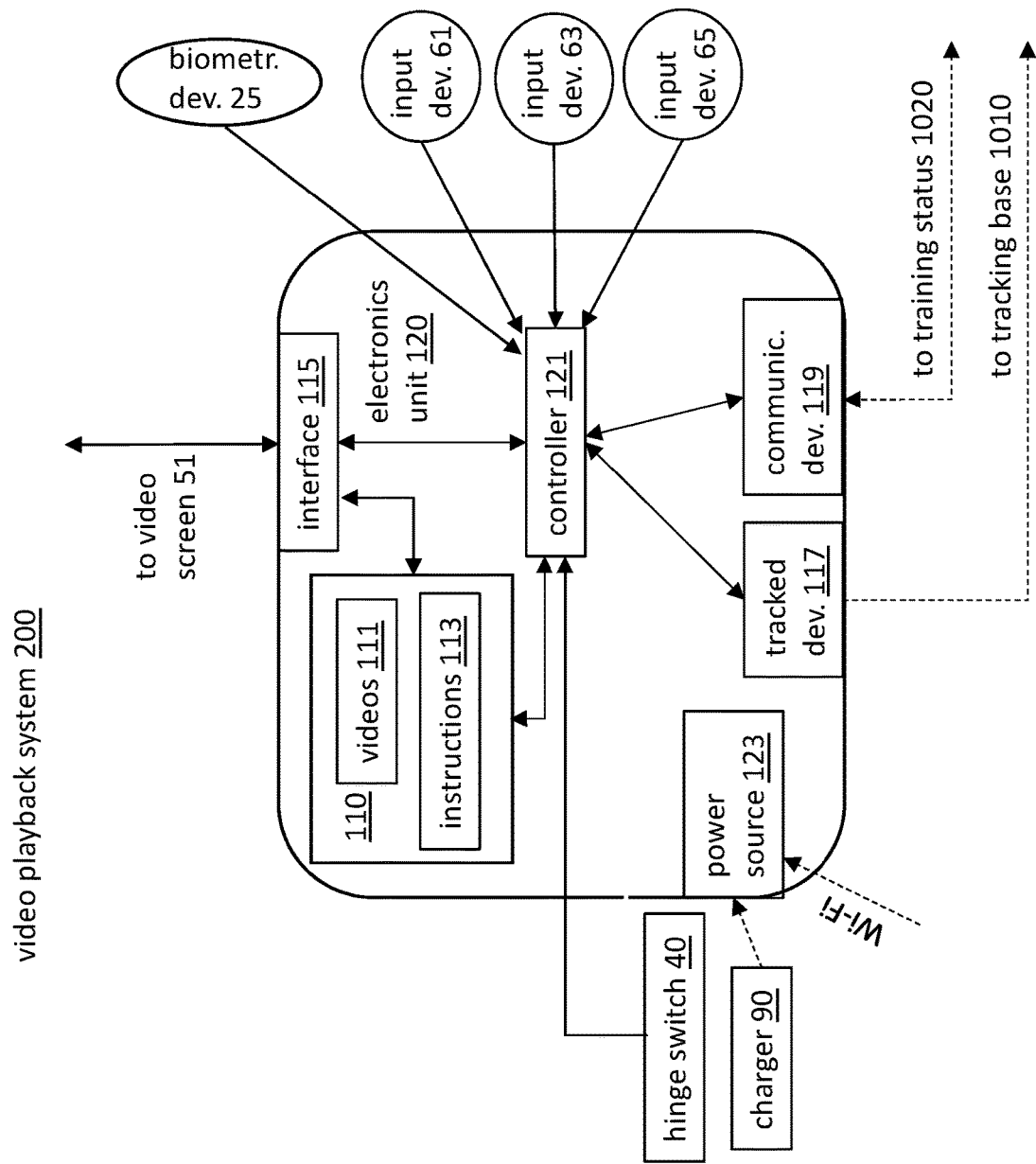
FIG. 3 shows a more detailed block diagram of the video card of FIG. 2.

In this embodiment inside page 21 has an output device 50 which is preferably a flexible screen 51 and speaker 53 coupled to video playback system 200 of FIG. 3.

The flexible video screen 51 and/or speaker 53 may be attached to other pages of the dedicated video training system 1000.

Dedicated video training system 1000 may also employ a plurality of input devices, 60, such as buttons coupled to electronics unit 120. These input devices 60 may be operated by a user to perform various functions.

Electronics unit 120 has the ability to wirelessly communicate with the remote tracking base 1010 and training status 1020 servers. This wireless capability can employ currently known means of wireless communications.

A charger 90 charges electronics unit 120 when proximate to the electronics unit 120. This can be by conventional inductive coupling and charging.

Front page 11 is shown here having a writeable portion 13 upon which the user can directly write notes. This may be used as an inexpensive, low-tech means of keeping track of who has already reviewed this video or one of the videos on this dedicated video training system 1000. Writable portion 13 is shown here on front page 11; however, it can be on any of the pages of video card 100.

FIG. 3 shows a more detailed block diagram of the video card of FIG. 2. It includes a storage or memory device 110 which may have prestored training videos 111 and/or executable instructions 113.

There is also an interface 115 which drives output device 50. The system is driven by a controller 121 which receives input from the hinge switch 40, input devices 61, 63, 65 and from tracking base 1010 through a tracked device 117. Optionally, a dedicated wireless communication device 119 may be implemented. This will allow the system to communicate better, but adds cost and bulk.

Controller 121 is the active element which runs the electronics unit 120. A power source 123 powers the elements of electronics unit 120. As shown here, power source 123 receives its power from charger 90. This is preferably by conventional inductive magnetic charging commonly use with some cell phones.

In an embodiment, high powered Wi-Fi not only allows wireless communication with a LAN, but also provides power to run low-power devices. This is described in "*Forget batteries: You Phone Can Soon Be Powered By WI-FI: Technology Using Radio Waves to Connect and Charge Devices*", DailyMail.com, Friday Apr. 28, 2017. If the video card 100 uses low-power electronics, it is possible to employ WI-FI to power the video card 100.

A low-power video card 100 would employ organic light emitting diodes (OLEDs), which are both flexible and low-power for the screen 51.

Other low-power elements could be used in the video card 100 as Amtel components (at (at www.atmel.com/technologies/lowpower/picopower.aspx). These electronic components operate at lower voltages, and increased electrical insulation to reduce 'power bleed' that wastes power.

Smart peripherals which require less 'hand-on' instruction from the CPUs allow CPUs to remain in sleep mode longer. These are offered as 'Sleepwalking' peripherals from Amtel at: www.atmel.com/Images/Atmel-42320-Implementing-Sleep-Walking-on-ARM-MCU-Application_ApplicationNote_AT04113.pdf.

All the above elements are made very small and thin to be sandwiched between the cardboard layers of one of the flaps 10, 20 of card 3 (FIG. 2).

The structure and functioning of the video training system 1000 will now be described in connection with FIGS. 1-4.

Figure 4:
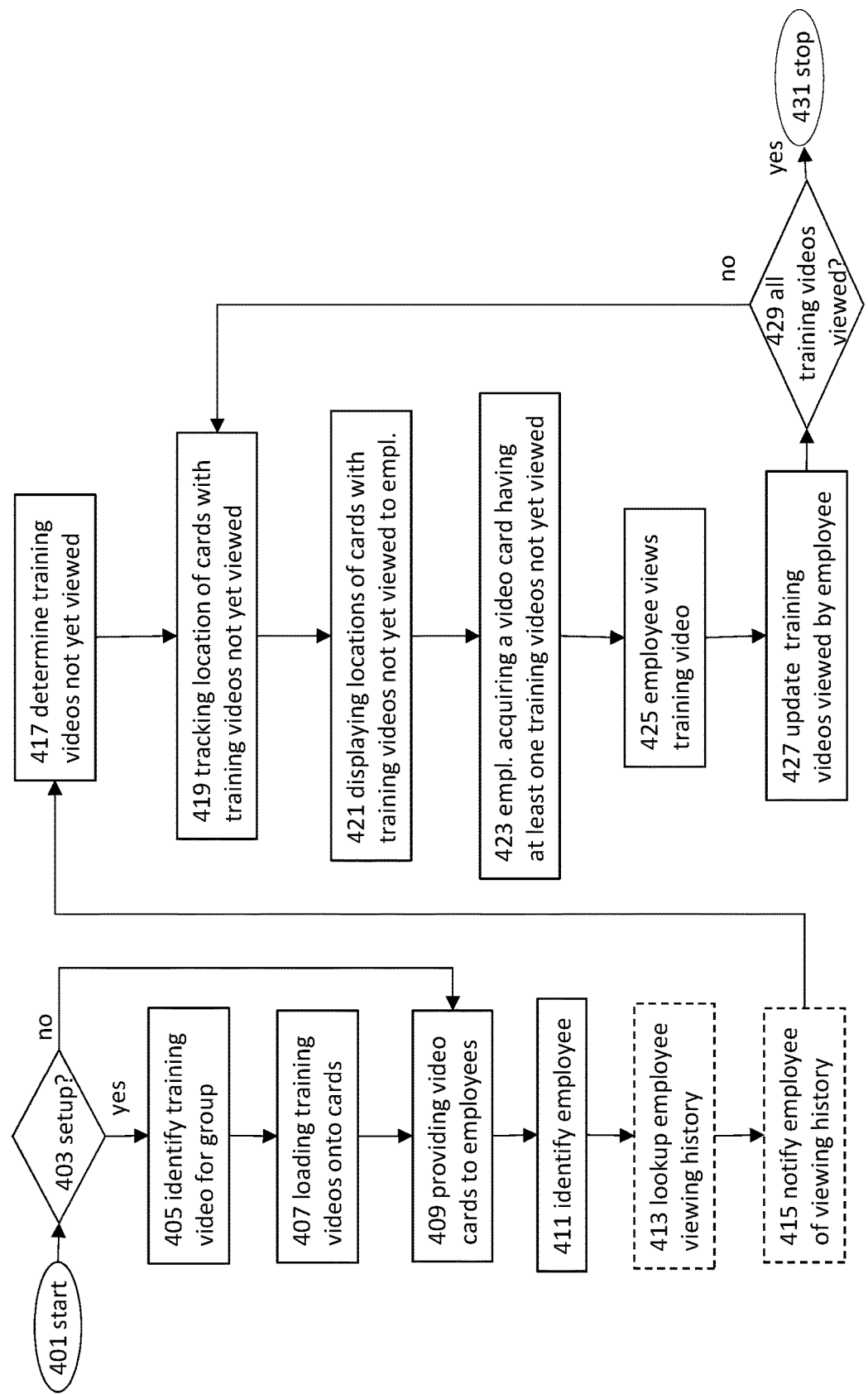
FIG. 4 is a flowchart illustrating the functioning of one embodiment of a video training system.

FIG. 4 is a flowchart illustrating the functioning of one embodiment of a video training system.

The process starts at step 401. In step 403, logic device (1030 of FIG. 1) checks to verify if setup of video cards 100 has been initialized. If so, ('yes") processing continues at step 409. If not ("no"), processing continues at step 405.

The training status device 1020 has prestored information of the employees, an identification of the groups the users belong to and the training videos that each is intended to view. In step 405, controller 121 interacts with training status device 1020 to determine which training videos are to be saved on which video cards 100.

In step 407, the controller 121 causes the training status device 1020 to load the video cards 100 with training videos designated for each card 100. In this embodiment, a communication device 119 of each video card 100 receives the training videos and forward them to controller 121 that stores them in a video section 111 of storage device 110.

In step 409, the video cards are provided to the groups of users.

In step 411, a user holds biometric devices 25 on the rear flap 20 of the video card 100 when beginning to view a training video. The biometric devices 25 identify the user and start the video card. Power is provided from power source 123 to all elements of the video card 100. These normally 'sleep' when not being operated to conserve power.

In step 411, controller 121 reads the biometric information from biometric devices 25 and looks up the user matching the biometric information prestored in storage device 110. The identity of the user is then passed from controller 121 through communication device 119 and to training status device 1020.

In step 413, the logic device 1030 looks up the viewing history of this user in training status device 1020.

In step 415, logic device 1030 sends the viewing history of this user to communication device 119 and then to controller 121 of the video card 100. This viewing history is then send to an interface 115 which displays the viewing history for this user on a flexible video screen 51.

In step 417, logic device 1030 also looks up training videos which this user should view on training status device 1020 that have not yet been viewed.

In step 419, a tracking base 1010 tracks the location of tracked device 117 of the video cards 100 and provides this information through communication device 119 to controller 121. Controller 121 can then cause interface 115 to display location of the video cards 100 and the video training videos that this user should view, but has not yet viewed. This may be in a graphical overlay on a localized map, or store floorplan, or other conventional means of identifying locations of objects. The display with other display options may be changed by the user interacting with input devices 61, 63 and 65.

In step 423, the user acquires a video card 100 having a training video that the user is intended to view, but has not yet viewed. This may be done by physically walking to another department in a department store and trading video cards 100 with another user (employee).

In step 425, the user views another training video. Again, the controller 121 of the newly acquired video card 100 reads from the biometric devices 25 to identify the user and the training video being viewed.

In step 427, this information is transferred back to the training status device 1020 and the user's viewing history is updated. This viewing history may also keep track of the last point viewed within a training video and allow the user to pick up at that point later.

In step 429, logic device 1030 interacts with the training status device 1020 to determine if the user has viewed all training videos that the user was intended to view.

If so, ("yes"), then the process stops at step 431. If not, then the process continues at step 419 for additional training videos.

Figure 5:
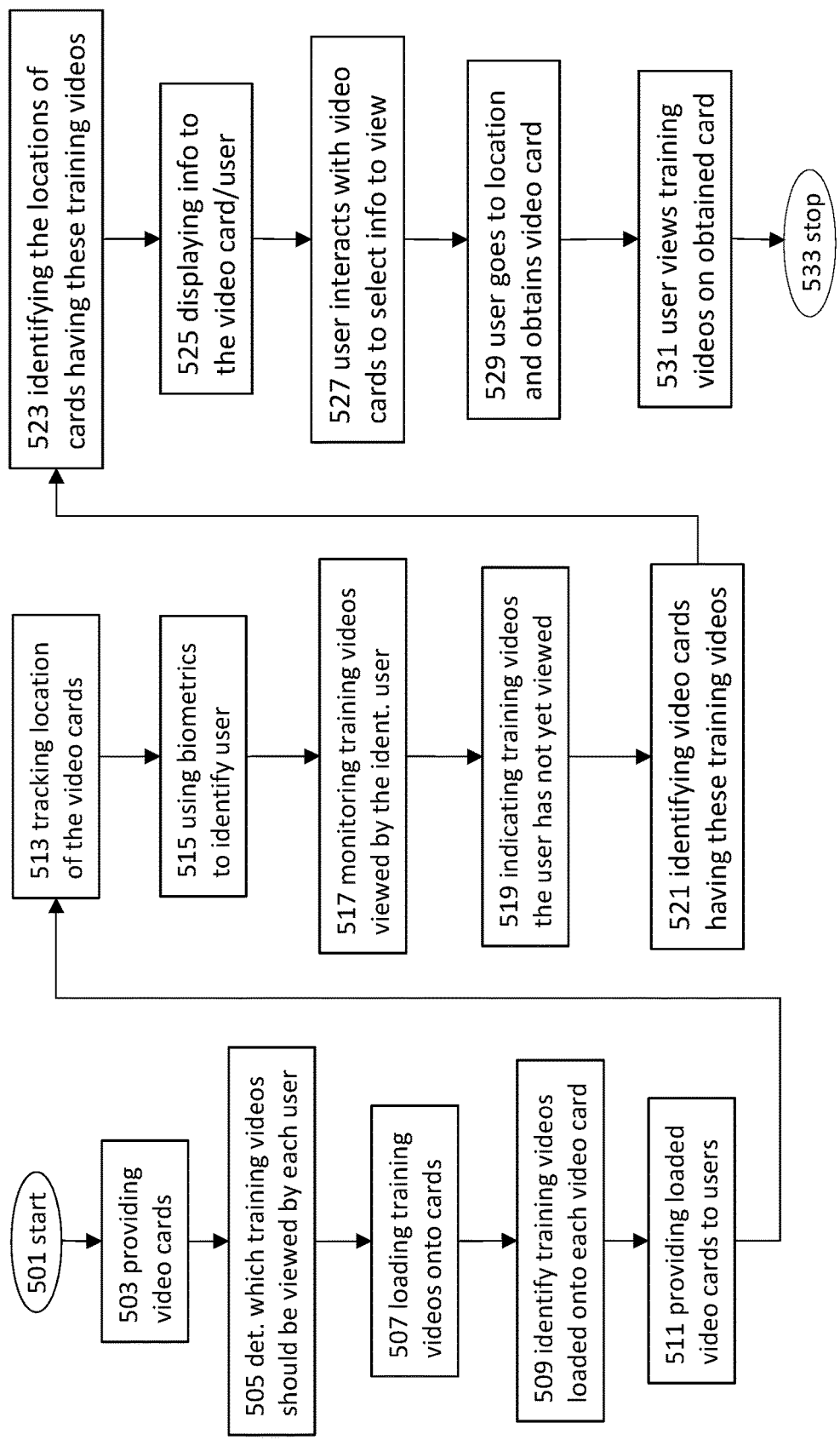
FIG. 5 is a flowchart illustrating the functioning of another embodiment of a video training system.

FIG. 5 is a flowchart illustrating the functioning of another embodiment of a video training system. This is an alternative method of providing training videos to users.

The process starts at step 501.

In step 503 low power video cards 100 are provided.

In step 505, the training status device 1020 determines which training videos should be viewed by each user.

In step 507, the training videos are loaded from the training status device 1020 onto a plurality of video cards 100.

In step 509, the training status device 1020 keeps track of which training videos are on which video cards 100.

In step 511, the loaded video cards 100 are provided to the users.

In step 513, the locations of the video cards 100 are tracked by tracking base 1010.

In step 515, biometric devices 25 are used to identify the user using the video card 100.

In step 517, training status device 1020 monitors the training videos viewed by the user.

In step 519, the logic device 1030 identifies the training videos a specific user has not yet viewed.

In step 521, the logic device 1030 determines which video cards have the videos identified in step 519.

In step 523, the logic device 1030 interacts with the tracking base 1010 to determine the location of the video card determined in step 521.

In step 525, logic device 1030, through the training status device 1020, displays an indication of the videos that a user still needs to view, the video cards 100 which have these videos and the location of these video cards 100 on a video card 100 held by the current user to display this information to that user.

In step 527, the user may interact with the input devices 61, 62, 63 of the video card 100 to selectively view this information.

In step 529, the user may then go to a location where one of the video cards 100 is that has a training video that he/she must view, and obtain this video card 100.

In step 531, the user may then view the training video on obtained video card 100.

The process stops at step 533.

The video cards 100 of this video card training system 1000 differs from iPads or other computing tablet since the electronics are dedicated to the purpose set forth above and do not have a general-purpose operating system. The video cards 100 of the current system is designed to be a single purpose device which is inexpensive and optionally intended to be disposed after several uses.

The video cards 100 have virtually no use besides playing short videos. They are not designed to have a capacity to play longer videos, such as feature motion picture films, and therefore less of a target for theft.

The video card 100 is made to be durable and flexible, so it will not break if dropped or someone sits on it.

For these and other reasons, it is uniquely suited to be left alone near a cash register or other workplace unattended, without the fear of being stolen or broken.

The video training system 1000 also can be uniquely set-up such that a card 100 will be loaded with training videos required for a specific group, such as cashiers. Therefore, the users will not have to waste time watching training videos that do not apply to them.

The video training system 1000 does not require leaving a workplace to go to seminars to see training videos. The employee can use it at their workstation.

The video training system 1000 can be started and used anytime, such as when the employee has free time. For example, when a cashier has no customers, he/she can begin viewing a training video, at the same place within the video where the employee stopped viewing and continue viewing. When the employee has to stop, it remembers where the employee stopped to use this as a place to start on the next viewing. Therefore, the employee can intermittently view training videos during short spans of free time during the workday.

Although a few examples have been shown and described, it will be appreciated by those skilled in the art that various changes and modifications might be made without departing from the scope of the invention, as defined in the appended claims.

What is claimed is:

1. A video training system configured to efficiently train users at their work locations in a retail store, comprising;
    a plurality of video cards distributed to the users, each configured to play back training videos, the video card comprising:
        a substantially thin body;
        a power source;
        a biometric device for identifying a user;
        a storage device having prestored training videos;
        a communications device configured to wirelessly communicate with an external device;
        a tracked device allowing its location to be tracked by the external device;
        a flexible, low-power video screen;
        a controller coupled to the storage device, configured to play the prestored training videos on the flexible, low-power video screen;
    a tracking base configured to track locations of the tracked devices of the plurality of video cards;
    a training status device having prestored information of which training videos each user is to view, and is configured to:
        communicate with the communications device of the video cards;
        receive information on the users that have used each video card, and the training videos viewed by each user;
        determine which training videos each user needs to view, but has not yet viewed;
    a logic device coupled to the tracking base and the training status device configured to:
        determine for each user:
            the training videos that need to be viewed,
            the video cards have these training videos;
            locations of these video cards; and
        notify the user of the training videos that need to be viewed, the cards having these training videos and their locations.

2. The video training system of claim 1 wherein the flexible, low-power video screen is a flexible, low-power, Organic LED screen.

3. The video training system of claim 1 wherein the biometric device is a fingerprint reader and is located on at least one side of the video card.

4. The video training system of claim 1 wherein each video card has at least two sides and at least one side has a writable area to visually keep track of which users have viewed training videos from this video card.

5. The video training system of claim 1 wherein the power source is rechargeable and is charged remotely using Wi-Fi.

6. The video training system of claim 1 wherein the communications device is configured to communicate with third-party video servers including social media sites, software as a service (SaaS) providers and video streaming sites to download training videos.

7. A method of providing training to a plurality of users at their worksite comprising the steps of:
    providing a plurality of low-power video cards adapted to store and play back training videos on a flexible, low-power video screen;
    identifying which training videos should be viewed by each user;

loading the identified training videos on the video cards such that every identified video is on at least one video card;
identifying the training videos loaded on each video card;
providing the loaded video cards to the users;
tracking locations of each of the video cards;
employing biometrics to identify the user using a video card,
monitoring the training videos viewed by the identified user; and
providing an indication of the training videos that the user needs to view but has not yet viewed, and the locations of the video cards having these training videos.

8. The method of claim 7, wherein the step of tracking the locations comprises the step of:
tracking the locations of the video cards and showing their locations overlaid on a map on the flexible, low-power video screen.

9. The method of claim 7, further comprising the step of:
requiring the user to mark on a writable portion of the dedicated video card, information indicating training videos the employee has viewed.

10. The method of claim 7, wherein the step of tracking the locations of each of the video cards, comprises the step of:
tracking the locations of each of the video cards using one of GPS, cellular phone, and Wi-Fi tracking.

11. The method of claim 10 wherein the step of tracking comprises the step of:
tracking the locations of video cards using Wi-Fi; and
the step of providing a plurality of video cards comprises the step of:
providing a plurality of low-power video cards having a power source adapted be charged by Wi-Fi charging.

12. The method of claim 7 wherein the step of providing a plurality of video cards comprises the step of:
providing a plurality of video cards each having a flexible, low-power, video screen.

13. The method of claim 7 wherein the step of providing a plurality of video cards comprises the step of:
providing a plurality of video cards each having enhanced sleep modes, low current leakage processors, to result in a video card which requires significantly less power to operate than a conventional device directed toward playing video and audio of the training videos.

14. The method of claim 7 wherein the step of providing a plurality of video cards comprises the step of:
providing a plurality of video cards each having a flexible, low-power, organic LED screen.

15. The method of claim 7 wherein the step of providing a plurality of video cards comprises the step of:
providing a plurality of video cards constructed of an inexpensive material that are intended to be discarded after several uses.

16. A video training system configured to efficiently train users in various departments of a retail store, comprising;
a plurality of disposable video cards distributed in the departments, each comprising:
a flat body made of a disposable material;
a storage device configured to store training videos;
a communication device configured to wirelessly receive training video data and store it in the storage device;
a tracked device allowing its location to be tracked by an external device;
a flexible, low-power video screen that is attached to the flat body;
a controller configured to display the received video data on the flexible, low-power video screen; and
a writable portion on the flat body allowing users to mark on the writable portion that they have viewed a training video on this video card;
a tracking base configured to track locations of the tracked devices of the plurality of video cards;
a training status device having prestored information of which training videos each user is to view, and is configured to:
communicate with the communication device of the video cards;
receive information from the communication devices of the users that have used each video card, and the training videos viewed by each user;
determine which training videos each user needs to view, but has not yet viewed; and
a logic device coupled to the tracking base and the training status device configured to determine for each user:
the training videos that need to be viewed,
the video cards having these training videos;
the locations of these video cards; and
notify the user of the training videos that need to be viewed, the video cards having these training videos and their locations; and
input devices which receive user input and provide the user input to the controller.

17. The video training system of claim 16 wherein the tracking base tracks the locations of video cards using one of GPS, cellular phone, and Wi-Fi tracking.

18. The video training system of claim 17 wherein:
the storage device, communication device, tracked device, and controller are designed to minimize power consumption by employing circuitry to maximize sleep periods when not in use, minimize current leakage, use low operating voltages, and employ direct memory access hardware; and
wherein the video cards are powered remotely through Wi-Fi charging.

19. The video training system of claim 17 wherein the input devices are configured to cause the controller to control selection and playback of the training videos.

20. The video training system of claim 16 wherein the communications device is configured to communicate with third-party video servers including social media sites, software as a service (SaaS) providers and video streaming sites to download training videos.

* * * * *